April 6, 1954   J. E. GARRETT ET AL   2,674,127
FLATNESS INDICATOR FOR CELLOPHANE FILM
Filed May 17, 1952
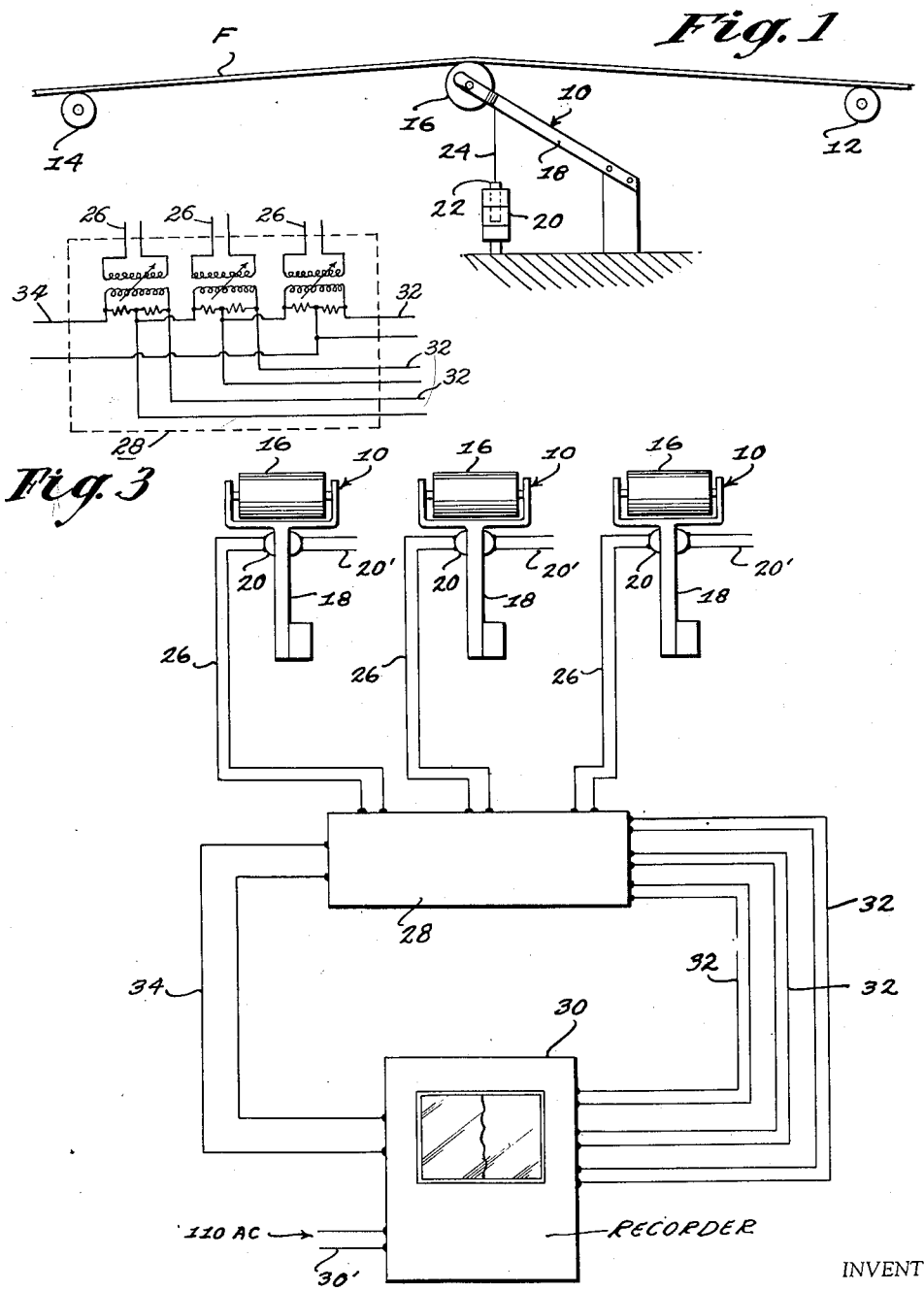
INVENTORS
JOHN E. GARRETT
MICHAEL B. KARELITZ
DELBERT R. JONES
BY Parrott, Richards & Sims
ATTORNEYS Patented Apr. 6, 1954

2,674,127

UNITED STATES PATENT OFFICE 2,674,127

FLATNESS INDICATOR FOR CELLOPHANE FILM

John E. Garrett, New Haven, Michael B. Karelitz, Fairfield, and Delbert R. Jones, Derby, Conn., assignors to Olin Industries, Inc., a corporation of Delaware Application May 17, 1952, Serial No. 288,574

5 Claims. (Cl. 73—159)

This invention relates to the manufacture of cellophane film and the like, and more particularly to means for continuously indicating the "flatness" of the cellophane film as it is formed on a casting machine.

"Flatness" of a cellophane film is a term used to describe the relative tendency of a cast film to sag or droop at some portions more than others when the film is suspended over distances of the order of 10 feet at low tensions. It is known that this tendency is caused by differing treatments of different longitudinal sections or "lanes" of the film in the casting machine dryer so that some lanes of the film wind up with appreciably different lengths (either shorter or longer) than the remainder of the film.

This effect has an important bearing on the subsequent usefulness of the film in a number of converting operations, such as multiple color gravure printing, and it is common to require a certain flatness specification for such uses. The conventional test for flatness is to draw out a length of the film under consideration at low tension for an unsupported length of about 10 feet and then measure the droop or sag of the film below some arbitrary reference point at several positions transversely of the film. This test is usually referred to as testing for "pullout," and is employed not only for periodic checks on casting machine operation, but also in the slitting room as an inspection method where particular flatness specifications must be met. The major difficulty of controlling the film flatness is not helped effectively by this test, however, because it is not possible to test more than a relatively small number of production samples in a given period of time, and it is accordingly not possible to determine how the film is running at any given time during that period.

This difficulty is overcome according to the present invention by the provision of means for continuously measuring the flatness of a cellophane film as it is running through the casting machine dryer. For this purpose, the measuring means of the present invention incorporates a plurality of feeler elements spaced transversely of the film and yieldably biased for tensioning an unsupported span of the film, a corresponding plurality of variable electrical input means in association with the several feeler elements for variation thereby as the tensioning positions of these elements vary, and an electrical network means for measuring and correlating the variations of the input means to obtain a flatness indication from the differential tensioning action of the several feeler elements.

This flatness indicating means of the present invention is described in further detail below in connection with the accompanying drawings, in which:

Fig. 1 is a fragmentary elevation illustrating more or less diagrammatically an arrangement for the film feeler elements in accordance with the present invention;

Fig. 2 is a plan view showing similarly an arrangement for the indicating network to measure and record the action of the feeler elements; and Fig. 3 is a diagram of the electrical network means.

In the embodiment of the present invention illustrated in the drawings, the flatness indicating feeler elements are represented generally in Fig. 1 at 10 disposed in tensioning relation with respect to a cellophane film F at an unsupported span thereof, as between spaced film guide rolls 12 and 14 arranged appropriately at the dryer section of a casting machine on which the film F is being formed.

As shown, the feeler elements 10 comprise film contact rolls 16 disposed on the casting machine by cantilever suspensions as at 18 in spaced relation transversely of the film F (compare Fig. 2), and thereby yieldably biased for independent tensioning of a plurality of longitudinal portions or "lanes" of the film F. The contact rolls 16 should be formed in a size providing a sufficient bearing area to avoid any puckering or deforming of the film F by the tensioning action. In Fig. 2, three of the feeler elements 10 are shown transversely spaced for measuring film flatness in accordance with the present invention, but it should be understood that the showing in Fig. 2 is purely representative and that a greater number of feeler elements 10 might be provided in the same manner for obtaining the flatness indication desired for a given width of film F.

In the illustrated embodiment, the tensioning action of the feeler elements 10 is employed to indicate flatness of the film F through the effect obtained on differential transformers 20 forming the variable electrical input means mentioned above. For this purpose, the armatures 22 for the transformers 20 are suspended from the feeler elements 10 as at 24, so that the output of these transformers 20 (which have a suitable alternating current input connection as at 20') is varied in correspondence with the tensioning positions of the feeler elements 10. As the flatness of the film F is a reflection of the varying tension at different film "lanes," the feeler elements 10 operate to transmit an indication of these lane tensions through output variation at the transformers 20.

In order to measure and record this flatness indication, the individual outputs from the transformers 20 are taken through circuit connections as at 26 to a suitable electrical dividing and totalizing network means 28 from which a continuous recording device 30, such as is disclosed in U. S. Patent No. 2,300,742, (having a conventional input connection as at 30' from a standard 110 v. A. C. line) is operated. This network means 28 divides the signals from individual transformer outputs, as illustrated in Fig. 3, and sends a portion of the signals direct to the recorder 30 by connections 32, while the balance of the signals are totalized and sent to the recorder 30 by connections as at 34 for use in continuously resetting the zero point of the recorder 30; thus each point printed by the multipoint recorder 30 represents the deviation of tension in each lane from the average tension in the processed sheet of film, and thereby eliminates the swamping effect of various random tension variations of much greater magnitude which occur in the casting machine dryer as a mill roll of the film F is wound up. The result is a continuously obtained record of the deviation in individual lane tensions of the film F from an average film tension which provides a constant film flatness indication directly at the casting machine for the film F being formed at any given time.

The lane tension variations to indicate flatness at the recorder 30 might be obtained as well from other means than the differential transformers 20 described above; for example, strain gauges, variable reluctance devices, or fluid feeler devices might alternatively be employed.

The present invention has been described above for purposes of illustration only and is not intended to be limited by this description or otherwise except as defined by the appended claims.

We claim:

1. Means for indicating the flatness of a flexible film such as cellophane film or the like, said means comprising a plurality of feeler elements spaced transversely of said film and yieldably biased for independently tensioning selected lanes of an unsupported span of said film, a corresponding plurality of variable electrical input means associated respectively with said feeler elements and varied thereby in accordance with variations in the tensioning positions of said elements, and electrical network means connected for measuring and correlating the variations of said input means.

2. Means for continuously indicating the flatness of a flexible film, such as cellophane film or the like, as a continuous web thereof is formed on a casting machine, said means comprising a plurality of feeler elements separately mounted on said casting machine adjacent the dry end thereof in spaced relation transversely of the path of travel of a film being formed thereon and yieldably biased for independently tensioning spaced lanes of an unsupported span of said film, a corresponding plurality of variable electrical input means associated respectively with said feeler elements and varied individually thereby in accordance with variations in the independent tensioning positions of said elements, and electrical network means connected for continuously measuring and correlating the variations of said input means.

3. Means for continuously indicating the flatness of a flexible film, such as cellophane film or the like, as a continuous web thereof is formed on a casting machine, said means comprising a plurality of yieldably suspended feeler rolls separately disposed on said casting machine in spaced relation transversely of the path of travel of a film being formed thereon for independently tensioning spaced lanes of an unsupported span of said film, a corresponding plurality of variable electrical input means associated respectively with said feeler rolls and varied individually thereby in accordance with variations in the independent tensioning positions of said rolls, and electrical network means connected for continuously measuring and correlating the variations of said input means.

4. Means for continuously indicating the flatness of a flexible film, such as cellophane film or the like, as a continuous web thereof is formed on a casting machine, said means comprising a plurality of feeler elements separately mounted on said casting machine adjacent the dry end thereof in spaced relation transversely of the path of travel of a film being formed thereon and yieldably biased for independently tensioning spaced lanes of an unsupported span of said film, a corresponding plurality of differential transformers associated respectively with said feeler elements and varied individually thereby in accordance with variations in the independent tensioning positions of said elements, and electrical network means connected for continuously measuring and correlating the variations of said input means.

5. Means for continuously indicating the flatness of a cellophane film or the like as a continuous web thereof is formed on a casting machine, said means comprising a plurality of feeler elements mounted on said casting machine adjacent the dry end thereof in spaced relation transversely of the path of travel of a film being formed thereon and yieldably biased for tensioning an unsupported span of said film, a corresponding plurality of variable electrical input means associated respectively with said feeler elements and varied thereby in accordance with variations in the tensioning positions of said elements, and electrical network means for continuously measuring the total variations of said input means as an indication reference and for continuously indicating and recording the deviation from said reference of the individual variations of said input means.

References Cited in the file of this patent

UNITED STATES PATENTS

| Number | Name | Date |
|---|---|---|
| 2,099,955 | Edwards | Nov. 23, 1937 |
| 2,100,653 | Umansky | Nov. 30, 1937 |
| 2,284,364 | Breazeale | May 26, 1942 |
| 2,343,229 | Stone et al. | Feb. 29, 1944 |